United States Patent [19]
Gordon

[11] 3,908,535
[45] Sept. 30, 1975

[54] APPARATUS FOR RECEIVING ARTICLES FOR IMMERSION INTO A FLUID FOR COOKING

[76] Inventor: Jerry Dale Gordon, 10765 E. 11th St., Tulsa, Okla. 74119

[22] Filed: Jan. 14, 1974

[21] Appl. No.: 432,986

[52] U.S. Cl. .................. 99/426; 99/448; 99/450
[51] Int. Cl.² ............................................ A47J 43/18
[58] Field of Search ............. 99/426, 327, 331, 336, 99/339, 403, 404, 411, 413, 414, 415, 416, 427, 428, 440, 448, 450; 134/164

[56] References Cited
UNITED STATES PATENTS

| | | | |
|---|---|---|---|
| 972,078 | 10/1910 | Harrison | 99/426 |
| 1,178,525 | 4/1916 | Lawrence | 99/448 X |
| 2,061,285 | 11/1936 | McCormick | 99/448 |
| 2,915,000 | 12/1959 | Hetzel et al. | 99/336 X |
| 3,140,651 | 7/1964 | Barnett | 99/426 X |
| 3,364,845 | 1/1968 | Wilson et al. | 99/336 |
| 3,525,299 | 8/1970 | Gouwens | 99/403 X |

*Primary Examiner*—Harvey C. Hornsby
*Assistant Examiner*—Arthur O. Henderson
*Attorney, Agent, or Firm*—William S. Dorman

[57] ABSTRACT

A container for receiving items for immersion in a cooking fluid includes a basket receiving frame of members defining a generally cylindrical configuration for receiving therewithin a pair of semicircular shaped baskets having walls of expanded metal or the like. Each basket includes a channel on an upper portion of a straight side thereof which is slidable over a respective one of a pair of rods mounted at an upper location within the frame to support the basket. A similar pair of rods are located at a lower location within the frame to provide horizontal support to the basket.

2 Claims, 2 Drawing Figures

APPARATUS FOR RECEIVING ARTICLES FOR IMMERSION INTO A FLUID FOR COOKING

BACKGROUND OF THE INVENTION

1. Field of the Invention

This invention relates to improvements in containers, and more particularly, to improvements in containers for receiving items to be immersed in a cooking fluid.

2. Description of the Prior Art

In the past, many types of containers or baskets have been advanced for receiving food or other items for immersion in a cooking fluid, such as heated shortening, boiling water, or the like. For example, Jennings, U.S. Pat. No. 3,187,664, discloses a deep-fat pressure cooker in which a plurality of cylindrically shaped food receiving baskets are provided mountable one on top of the other submersible in a cylindrical tank presenting the pressurized cooking environment. The stackable baskets are of expanded metal or the like, a typical material from which such food receiving baskets are fabricated to enable the cooking environment to contact the contained food. A similar structure is presented by Pupilla, U.S. Pat. No. 1,755,895, a sterilizer in which vertically stacked trays containing the items to be sterilized are immersed within a sterilization fluid.

Wells, U.S. Pat. No. 3,242,849, also shows the use of a pair of baskets, arranged side by side in a synchronous double automatic fryer. The baskets, however, are separately immersible and withdrawable from the fluid, and are held by hangers provided on the walls of the cooking fluid container. There is, however, no single holding structure disclosed for simultaneously carrying the baskets and immersing and withdrawing the baskets from the fluid. A simultaneous immersion facility is shown by Santarsiero, U.S. Pat. No. 1,519,510, in which a single basket is divided by a vertical divider within the basket, whereby one food product can be located on one side of the basket, and another food product on the other. The Santarsiero cooker basket, however, is of a single unit, no facility being provided for separation or independent manipulation of the basket halves.

Finally, Harris, U.S. Pat. No. 2,138,967, discloses a cooking basket having a bottom divided into two semicircular shaped opening members for convenience in draining the cooking fluid. There is, however, no division within the basket, or a facility for independent manipulation of separate food products within the single basket.

What is needed is a pair of independent baskets, which can contain the same or different items to be immersed in a cooking fluid, and a supporting frame for selectively receiving one or both of the baskets thereby enabling synchronous or independent manipulation thereof and for carrying and supporting the baskets during immersion.

SUMMARY OF THE INVENTION

In light of the above, it is, therefore, an object of the invention to present a container for receiving items for immersion in a cooking fluid.

It is another object of the invention to present a container having removable basket portions arrangeable within a convenient cylindrical configuration.

It is still another object of the invention to present a container for receiving items for immersion in a cooking fluid in which a pair of semicircular cross-sectionally shaped baskets are removably carried within a frame to present an overall unit of generally cylindrical shape.

It is yet another object of the invention to present a container for receiving items for immersion in a cooking fluid which can removably receive at least one cooking basket.

These and other objects, features, and advantages, will become apparent to those skilled in the art from the following detailed description when read in conjunction with the accompanying drawing and appended claims.

In accordance with the invention, in its broad aspect, a container for receiving items for immersion in a cooking fluid is presented. The container comprises a pair of baskets and a frame for supporting the baskets. A pair of rails are attached to the frame, and a pair of channels are attached to a respective one of the baskets for slideably receiving one of the pair of rails to suspend the baskets from the rails.

BRIEF DESCRIPTION OF THE DRAWING

The invention is illustrated in the accompanying drawing wherein.

DETAILED DESCRIPTION OF THE PREFERRED EMBODIMENTS

Figure 1:
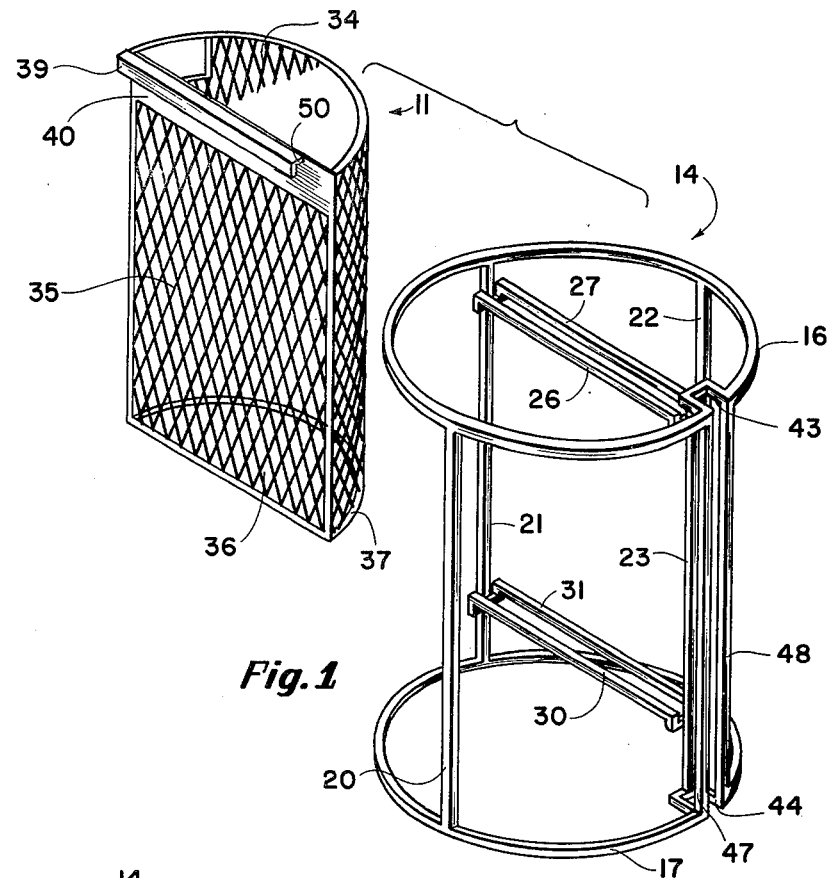
FIG. 1 is a perspective view of the frame and one of the baskets receivable therein for receiving items for immersion in a cooking fluid, in accordance with the invention.
Figure 2:
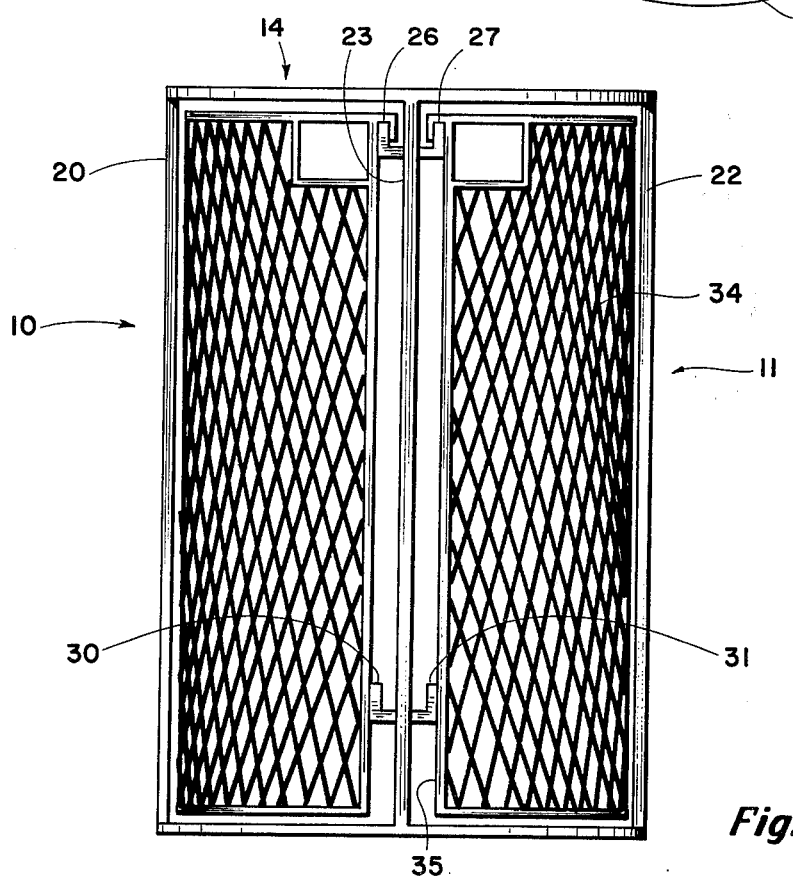
FIg. 2 is a side elevation of the frame of FIG. 1 and two baskets carried thereby, in accordance with the invention.

With reference to FIGS. 1 and 2 of the invention, a pair of open-topped baskets 10 and 11 are receivably carried by a frame 14. The frame 14 includes an upper frame 16 and a lower frame 17, both of generally circular shape or configuration. The upper and lower frames 16 and 17 are interconnected by four rods or braces 20, 21, 22, and 23, which are welded (welds not shown) or otherwise attached to the upper and lower frames 16 and 17.

A first pair of parallel rods 26 and 27 are attached between the front brace 23 and rear brace 21, the rod 27 being oriented toward the right side of the frame 14, and the rod 26 being oriented toward the left side of the frame 14. The rods 26 and 27 are bent or formed at the ends to present an upstanding portion of "L" shape as shown in FIG. 2 to present a basket receiving rail. To effect this rail, for example, the end portions of the rods 26 and 27 can be bent downwardly, then inwardly, as shown, the inwardly bent portion being welded or otherwise affixed to a respective one of the interconnecting braces 21 and 23. Each of the rails 26 and 27 serve to slidably receive and support one of the baskets 10 or 11, as below described in detail.

A second set of braces or members 30 or 31 are provided, the brace 31 oriented toward the right side of the frame 14, and the similar brace 30 oriented toward the left side of the frame 14, attached between the front brace 23 and the rear brace 21 of the frame 14. The second set or pair of braces 30 and 31 are located at a generally lower portion of the frame, as shown, and are fabricated in a fashion similar to that above described with reference to the basket receiving braces or rails 26 and 27, to form a "L" shaped member to present horizontal support to the baskets, as will become apparent below.

The various parts of the frame are illustrated as being of square or rectangular cross-sectional shape; however, it should be understood that other configurations can be equally advantageously employed, for example, in using braces and frame members of circular, oval, or other cross-sectional configuration.

Each of the baskets 10 and 11, received within the frame 14, are of substantially identical construction. The right basket 11, shown in FIG. 1, is of semicircular cross-sectional shape, and is of height approximately equal to the height of the frame 14 within which it is received. The sides 34 and 35 and bottom 36 of the basket 11 are of a material presenting a number of holes through which the cooking fluid is free to flow, such as expanded metal, or the like. The material of the sides 34 and 35 and the bottom 36 are welded or attached to a frame 37 of the relative semi-circular cylindrical configuration shown.

On the flat or straight side 35 of the basket 11, adjacent a top portion, as shown, is located a rail receiving channel 39, attached to the basket 11 upon a plate 40. The basket 11 is therefore located within the supporting frame 14 by sliding the rail receiving channel 39 over and along the length of the right rail 27. As shown in FIG. 2, the bottom rail 31 bears upon the flat side 35 of the basket 11 near a bottom portion to present horizontal support to the basket 11. Thus, the basket 11, tending to rotate about the upper rail 27 within the receiving channel 39, is constrained by the lower rail 31. The left basket 10 of similar complimentary configuration, is likewise located within the other side of the frame, as shown in FIG. 2.

When the baskets 10 and 11 are located and suspended within the frame 14, the overall configuration is that of a cylinder. The cylinder can then be immersed in a cylindrical tank of cooking fluid for the desired period to cook the items placed within the pair of baskets 10 and 11.

Some cookers for receiving cylindrical baskets presently employed include a guiding rod or the like to prevent the basket containing the items to be cooked from rotating, to facilitate its immersion and withdrawal from the cooking fluid. To accommodate such rail, or rod, indentations 43 and 44 can be provided, if desired, within the upper and lower circular frames 16 and 17 as shown and the support brace 23 can be moved inwardly by the distance of the indentation. If desired, additional supporting braces 47 and 48 can be employed at the corners of such indentation. Additionally, if such indentation is employed, the channel for receiving the supporting rail can be forshortened at its end 50, as shown in FIG. 1, a distance to accommodate such indentation, to enable the basket 11 to be placed entirely within the frame 14.

Since the items intended to be received in the container, in accordance with the invention, may be cooked by immersion in cooking fluids of relatively high temperatures, it is desirable that the container elements be made of a material which will withstand repeated exposure to such fluids and temperatures without corrosion. It has been found, for example, that stainless steel is suitable for such purpose, although other materials can be equally advantageously employed, depending upon the particular environments to which they will be exposed.

Although the invention has been described and illustrated with a certain degree of particularity, it is understood that the present disclosure is made by way of example only, and in numerous changes in the arrangement in combination of parts may be resorted to without departing from the spirit and scope of the invention as hereinafter claimed.

What is claimed is:

1. A container for receiving items for immersion in a cooking fluid, comprising:

a frame, including upper and lower circular shaped frames, a plurality of rods interconnecting said upper and lower circular shaped frames spacing said upper and lower circular shaped frames apart, and two pair of parallel rails, attached between a pair of said rods, said two pairs of rails each pair being disposed mutually parallel, one being located near a top portion of said rods, the other being located adjacent a bottom portion of said rods;

a pair of baskets of semicircular cross-section shape having a straight side and a curved side of radius approximately equal to a radius of said upper and lower circular shaped frames;

a pair of channels each attached to a respective one of said baskets, upon the straight side adjacent a top portion thereof, said channel slidably receiving one of said rails of said pair of rails adjacent the top portion of said rods, said bottom located pair of rails bearing upon a bottom portion of said baskets to present horizontal support therefor.

2. The container of claim 1 wherein said baskets are expanded metal on the sides and bottom, and having an open top.

* * * * *